US010482128B2

(12) United States Patent
Ogren

(10) Patent No.: US 10,482,128 B2
(45) Date of Patent: *Nov. 19, 2019

(54) SCALABLE APPROACH TO INFORMATION-THEORETIC STRING SIMILARITY USING A GUARANTEED RANK THRESHOLD

(71) Applicant: Oracle International Corporation, Redwood City, CA (US)

(72) Inventor: Philip Ogren, Boulder, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 15/595,393

(22) Filed: May 15, 2017

(65) Prior Publication Data

US 2018/0330015 A1 Nov. 15, 2018

(51) Int. Cl.
*G06F 17/30* (2006.01)
*G06F 16/903* (2019.01)
(Continued)

(52) U.S. Cl.
CPC .... *G06F 16/90344* (2019.01); *G06F 16/2228* (2019.01); *G06F 16/2272* (2019.01);
(Continued)

(58) Field of Classification Search
USPC ........ 707/607, 609, 687, 705, 790, 813, 821
See application file for complete search history.

(56) References Cited

U.S. PATENT DOCUMENTS 6,233,545 B1 5/2001 Datig
6,715,128 B1 3/2004 Hirashima
(Continued)

FOREIGN PATENT DOCUMENTS

JP 2009075791 4/2009
WO 9848360 10/1998

OTHER PUBLICATIONS

Minghe Yu, Guoliang Li, Dong Deng, and Jianhua Feng. 2015. String similarity search and join: a survey. Frontiers of Computer Science, pp. 1-19. 2015.
(Continued)

*Primary Examiner* — Sana A Al-Hashemi
(74) *Attorney, Agent, or Firm* — Marsh Fischmann & Breyfogle LLP; Kent A. Lembke

(57) ABSTRACT

A string analysis tool for calculating a similarity metric between an input string and a plurality of strings in a collection to be searched. The string analysis tool may include optimizations that may reduce the number of calculations to be carried out when calculating the similarity metric for large volumes of data. In this regard, the string analysis tool may represent strings as features. As such, analysis may be performed relative to features (e.g., of either the input string or plurality of strings to be searched) such that features from the strings may be eliminated from consideration when identifying candidate strings from the collection for which a similarity metric is to be calculated. The elimination of features may be based on a minimum similarity metric threshold, wherein features that are incapable of contributing to a similarity metric above the minimum similarity metric threshold are eliminated from consideration.

18 Claims, 6 Drawing Sheets

(51) Int. Cl.
  *G06F 16/338* (2019.01)
  *G06F 16/951* (2019.01)
  *G06F 16/22* (2019.01)
  *G06F 16/33* (2019.01)

(52) U.S. Cl.
  CPC ........ *G06F 16/338* (2019.01); *G06F 16/3346* (2019.01); *G06F 16/951* (2019.01)

(56) References Cited

U.S. PATENT DOCUMENTS

| | | | |
|---|---|---|---|
| 7,111,013 B2 | 9/2006 | Federighi | |
| 7,225,199 B1 | 5/2007 | Green et al. | |
| 7,233,956 B2 | 6/2007 | Balducci | |
| 7,240,063 B2 | 7/2007 | Aoyama | |
| 7,536,634 B2 | 5/2009 | Green | |
| 7,769,772 B2 | 8/2010 | Weyl | |
| 7,822,789 B2 | 10/2010 | Jiang | |
| 7,840,538 B2 | 11/2010 | Joshi | |
| 7,865,358 B2 | 1/2011 | Green et al. | |
| 7,912,907 B1 | 3/2011 | Mantel | |
| 8,199,985 B2 | 6/2012 | Jakobsson et al. | |
| 8,321,400 B2 * | 11/2012 | Gosse | G06F 16/951 707/708 |
| 8,396,859 B2 | 3/2013 | Green et al. | |
| 2003/0061212 A1 | 3/2003 | Smith | |
| 2004/0172484 A1 | 9/2004 | Hafsteinsson | |
| 2007/0143327 A1 | 6/2007 | Rivas | |
| 2007/0239679 A1 | 10/2007 | Wieser | |
| 2009/0281732 A1 | 11/2009 | Turnbull | |
| 2010/0077011 A1 | 3/2010 | Green | |
| 2010/0131561 A1 | 5/2010 | Lin | |
| 2010/0185689 A1 | 7/2010 | Hu | |
| 2011/0093467 A1 | 4/2011 | Sharp | |
| 2011/0106836 A1 | 5/2011 | Hassanzadeh | |
| 2012/0078919 A1 * | 3/2012 | Mineno | G06F 17/278 707/748 |
| 2012/0271827 A1 * | 10/2012 | Merz | G06F 16/90344 707/737 |
| 2014/0067728 A1 * | 3/2014 | Ogren | G06F 17/2264 706/12 |
| 2014/0082021 A1 * | 3/2014 | Hendrey | G06F 16/90344 707/772 |
| 2014/0236994 A1 * | 8/2014 | Aikawa | G01C 21/3611 707/772 |
| 2016/0004937 A1 * | 1/2016 | Kurzer | G06F 16/90344 382/229 |
| 2016/0103906 A1 * | 4/2016 | Li | G06F 17/2705 707/742 |

OTHER PUBLICATIONS

Mrissa et al., A Context Model for Semantic Mediation in Web Services Composition, Springer 2006, pp. 12-25.* 2006.

Cruz et al., Ontology Enrichment and Automatic Population from XML Data, ACM 2008, pp. 1-5.* 2008.

Waterson et al., Verifying Ontological Commitment in Knowledgebased Systems, Elsevier 1999, pp. 45-54.* 1999.

Lin, Dekang, "An Information-Theoretuc Definition of Similarity", Dept. of Computer Science, University of Manitoba, 9 pages Jul. 24, 1998.

"Integrating External Knowledge to Supplement Training Data in Semi-Supervised Learning for Text Categorization" Mohammed Benkhalifa et al Information Retrieval, 4, 91-113, 2001 c 2001 Kluwer Academic Publishers. Manufactured in the Netherlands.* 2001.

"Duplicate Record Detection: A Survey" Ahmed K. Elmagarmid et al IEEE Transactions on Knowledge and Data Engineering, vol. 19, No. 1, Jan. 2007.* Jan. 1, 2007.

Chen, Li et al., "Efficient Merging and Filtering Algorithms for Approximate String Searches", Data Engineering, 2008 ICDE 2008. IEEE 24th International Conference on, IEEE, Piscataway, NJ, USA, Apr. 7, 2008, pp. 257-266, XP031245983, ISBN: 978-1-4244-1836-7. Apr. 7, 2008.

Naoaki Okazaki et al., "Simple and Efficient Algorithm for Approximate Dictionary Matching", Proceedings of the 23rd International Conference on Computational Linguistics, Aug. 2010, pp. 851-859, XP055094147, Retrieved from the Internet: URL:http://www.aclweb.org/anthology/C 10-1096 .pdf. Aug. 2010.

Miller Ethan et al., "Performance and Scalability of a Large-Scale N-gram Based Information Retrieval System", Internet Citation, 2000, XP007903178, Retrieved from the Internet: URL:http// citeseer.ist. psu .edu/ cache/papers/ cs/15 866/http: zSzzSzwww.c se. ucsc. eduzSz-elmzSzPaperszSztelltale.JODI.pdf/ miller00performance.pdf. 2000.

* cited by examiner

SCALABLE APPROACH TO INFORMATION-THEORETIC STRING SIMILARITY USING A GUARANTEED RANK THRESHOLD

FIELD

This disclosure is generally related to computer-based tools for searching using string similarity analysis.

BACKGROUND

String similarity analysis or "string matching" generally relates to determining the degree of similarity between two strings of data. String matching may be used in a variety of applications including data quality, searching, clustering, or other approaches to data analysis. In a simple example, two strings may differ in ways such as the perturbation of a single character. For instance, the strings "Mississippi" and "Mississippe" differ with respect to a single character. However, differences between related strings may be much more complicated.

A number of different approaches to characterizing or quantifying the relative similarity between strings have been proposed. However, many such approaches require subjective tuning of various parameters by a human user to tailor an approach to a given application or context. Examples of prior approaches proposed for performing string matching analysis may include deterministic matching and fuzzy matching. Deterministic matching involves a cascading sequence of match scenarios where when a match occurs, the sequence stops. Fuzzy matching algorithms attempt to match two strings typically through the use of a cost or distance function that is minimized. Each of these approaches has disadvantages. Thus, there is a continued need for string matching analysis approaches.

SUMMARY

In view of the foregoing, embodiments described herein relate to a string analysis tool comprising a computer-based search tool. The string analysis tool may be used to perform analysis of strings to return results from a collection of strings in response to receipt of an input string. In turn, the search tool may be facilitated that allows searching a collection of strings. The collection of strings may relate to any number of different data sets including strings of textual characters including, for example, directory information, websites, product listings, or any other collection of textual strings.

The search tool described herein may be particularly suited to efficiently and quickly return a given number of "top results" that represent strings from the collection of strings being searched with the highest similarity to an input string. When performing a search of a collection of strings, calculating a similarity value for every string in the collection may be of little value because very low similarity results are likely to hold little value to the search user. In contrast, a search in which a given number of results are returned that are most similar to the input string may provide highly relevant results to the user and allow for efficient calculation of similarity values for the relevant results returned. In relation to efficiency and search speed, a search utility described herein may provide "search-as-you-type" feedback to a user. That is, a user may be presented with relevant strings from the collection based on even a partial input such that the results may potentially be obtained even without fully completing the query to be searched. In this regard, a search performed according to the approaches described herein may allow for return of a number of top results for each new character of input string as it is provided.

Generally, the search tool described herein may be operable to represent strings as features. The features of an input string may be compared to corresponding features of strings in a collection of strings to be searched to calculate the similarity (e.g., quantified as a similarity metric) between the input string and the strings in the collection to be searched. However, for very large collections of strings, the calculation of a similarly metric for each string in the collection may require a large amount of computational resources and time such that the analysis may be cost and time prohibitive.

In this regard, the search tool described herein may employ a number of optimizations that may reduce the number of similarity metric calculations that are required to be performed such that similarity metrics are only calculated for a portion of the strings in the collection to be searched. For instance, it has been found that features of textual strings generally follow a Zipfian distribution. Based on this understanding, features of little information value may be eliminated from consideration. This elimination may be done without harming the potential results as features may be eliminated from consideration that do not have the possibility of contributing to a sufficient similarity metric. Specifically, approaches to optimization described herein may include feature pruning from an index of features, input feature filtering of input features from an input string, and/or a guaranteed rank threshold calculation.

In certain contexts of optimization, a predetermined minimum similarity metric threshold is provided. Utilizing the minimum similarity metric threshold, embodiments of the search tool may identify features (e.g., of the input string and/or indexed features from the plurality of strings to be searched) that may be eliminated from consideration in the string analysis. For example, features may be eliminated from consideration based on a determination that the features to be eliminated cannot possibly return a similarity metric above the minimum similarity metric threshold.

In at least some embodiments, an index may be compiled (e.g., precompiled prior to receipt of an input string) that includes information related to the distribution or frequency of indexed features in the strings to be searched. In an implementation, the index may be an inverted index that includes a mapping between each feature and strings in which the indexed feature occurs. As such, the index may be employed to provide information related to features identified from the strings to be searched. In at least one embodiment presented in this disclosure, indexed features may be eliminated from the index even before receipt of the input string. As such, at least some pre-computation may occur prior to receipt of the input string. Furthermore, indexed features may be eliminated from consideration based on known parameters of the source features in the target strings.

Further still, use of a guaranteed ranking threshold may provide an iterative approach to generating search results that may drastically increase the speed at which the search may be performed. In this regard, a first aspect includes a method for generating ranked search results using string analysis executed by a computer-based search tool. The method includes compiling, using the computer-based search tool, an index. The index contains a plurality of indexed features corresponding to features of a plurality of strings of a collection to be searched. The index also includes a mapping between each respective one of the plurality of indexed features and corresponding respective ones of the plurality of strings in the collection containing the respective indexed feature. Furthermore, the index includes a weight for each indexed feature. There are many possible weighting schemes for the indexed features, but it is convenient to make use the frequency of the indexed feature to determine weights. Calculating self-information of each feature as the feature weighting scheme is one possible feature weighting scheme to derive a self-information weight for each indexed feature.

In turn, the method includes receiving, using the computer-based comparison tool, an input string and representing the input string as one or more input features. The method also includes selecting one or more candidate strings from the plurality of strings of the collection that have at least one indexed feature in common with the one or more input features of the input string. The method includes calculating, using the computer-based search tool, a similarity metric for the input string relative to the candidate strings. The similarity metric is at least partially based on commonality between the input string and each respective candidate string. The method also includes determining a guaranteed portion of the candidate strings for inclusion in the ranked search results using a guaranteed rank threshold that is calculated based on self-information weights from the index regarding the one or more input features. The guaranteed portion of the strings have a similarity metric greater than the guaranteed rank threshold. In turn, the method includes ranking the guaranteed portion of candidate strings for presentation in the ranked search results according to the respective similarity metrics of the candidate strings.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in the method of the first aspect, the similarity metric may only be calculated for the candidate strings. In turn, the number of times a calculation of a similarity metric is required may be drastically reduced to produce search results. This may allow for an efficient, fast search of even a large number of strings in a collection to be searched. In addition, the increased speed at which searches may be performed may allow for search-as-you-type functionality in which a search is conducted, for example, in relation to each new keystroke of an input string being provided. In this context, a search may be performed even before receipt of the entire search query from the user.

In an embodiment, the determining may include an iterative determination of the guaranteed rank threshold considering an additional input feature in ascending order of frequency of input features in the index for each iteration. For example, each iteration of the iterative determination of the guaranteed rank threshold may be based on a sum of the self-information weight of each of the input features considered in the iteration. As such, for each subsequent iteration, the next most frequent input feature may be added for consideration in relation to calculating the guaranteed rank threshold. In turn, the method may include adding additional candidate strings to the guaranteed portion of strings in response to each iterative determination of the guaranteed rank threshold. In addition, the method may include determining a potential portion of the candidate strings for inclusion in the ranked search results. For this potential portion of candidate strings, the similarity metric for the candidate strings exceeds a minimum similarity metric and is less than the guaranteed rank threshold. The method may include ranking the guaranteed portion and the potential portion of the candidate strings for presentation as the ranked search results. However, inclusion of the potential portion of the candidate strings may be conditional on subsequent iterations of the guaranteed rank threshold.

The iterative determination of the guaranteed rank threshold may continue until one or more of a number of conditions exist. For instance, the determining may include continuing the iterative determination until all input features have been considered in generating the guaranteed rank threshold. Additionally or alternatively, the determining may include continuing the iterative determination until the guaranteed rank threshold falls below a minimum similarity threshold value. Additionally or alternatively, a maximum number of results parameter may be provided, and the determining may include continuing the iterative determination until the guaranteed portion satisfies the maximum number of results parameter. The ranked search results may include candidate strings from the potential portion when the guaranteed portion of strings is less than the maximum number of results parameter.

In an embodiment, the similarity metric may include an input weight that corresponds to a measure of the contribution of the input features to the similarity metric and a candidate weight that corresponds to a measure of the contribution of candidate features to the similarity metric. The input weight and the candidate weight sum to a value of one. The guaranteed rank threshold may apply the input weight to the self-information weight of the input string and the candidate weight to difference of the self-information weight of the input string and the sum of the self-information of each of the individual input features included in the guaranteed rank threshold calculation for a given iteration. As the input string may comprise less than an entire search query, it may be desirable to tune the input weight and candidate weights such that the penalty for a feature appearing in the candidate string, but not the input string is low. In this regard, the input weight may be greater than the candidate weight. Specifically, the input weight may be at least twice the candidate weight. In certain applications, the input weight may be at least about 0.9.

In an embodiment, the method may also include re-ranking the ranked search results based on an external metric related to the strings of the collection. The re-ranking may be based on the similarity metric and the external metric. As will be appreciated in the discussion below, the similarity metric may comprise values between 0 and 1. In this regard, rather than an arbitrary measure, the similarity metric ranging from 0 to 1 may allow for easily incorporating external metrics for the purpose of re-ranking. Moreover, weighted averaging may be used in the re-ranking where the similarity metric and the external metric may be given different relative weights in relation to the re-ranking. That is, the re-ranking may include a weighted summation of the similarity metric and the external metric. Examples of external metrics may include one of a page rank value, a population, and a popularity value.

A second aspect includes an apparatus for use in generating ranked search results using string analysis. The apparatus includes a data store comprising an index. The index includes a plurality of indexed features corresponding to features of a plurality of strings of a collection to be searched, a mapping between each respective one of the plurality of indexed features and corresponding respective ones of the plurality of strings in the collection containing the respective indexed feature, and a self-information weight for each indexed feature based on the frequency of the indexed feature in the strings of the collection to be searched. The apparatus also includes a user interface for receipt of an input string. The input string is represented as one or more input features. The apparatus may include a search tool executed by a computer. The search tool may select one or more candidate strings from the plurality of strings of the collection that have at least one common indexed feature relative to the input string. The search tool may also calculate a similarity metric for the input string relative to the candidate strings and determine a guaranteed portion of the candidate strings for inclusion in the ranked search results using a guaranteed rank threshold that is calculated based on self-information weights from the index regarding the one or more input features. The guaranteed portion of the strings have a similarity metric greater than the guaranteed rank threshold. The search tool may further rank the guaranteed portion of the candidate strings for presentation as the ranked search results using the user interface according to the respective similarity weights of the candidate strings.

A number of feature refinements and additional features are applicable to the second aspect. These feature refinements and additional features may be used individually or in any combination. As such, each of the foregoing features that discussed in relation to the first aspect may be, but are not required to be, used with any other feature or combination of features of the second aspect.

A third aspect includes a system for use in generating ranked search results using string analysis. The system includes an indexing means for compiling an index. The index includes a plurality of indexed features corresponding to features of a plurality of strings of a collection to be searched, a mapping between each respective one of the plurality of indexed features and corresponding respective ones of the plurality of strings in the collection containing the respective indexed feature, and a self-information weight for each indexed feature based on the frequency of the indexed feature in the strings of the collection to be searched. The system also includes a search interface means for receiving an input string and a string matching. The string matching means is provided for representing the input string as one or more input features, selecting one or more candidate strings from the plurality of strings of the collection that have at least one common indexed feature relative to the input string, and calculating a similarity metric for the input string relative to the candidate strings. The similarity metric is at least partially based on commonality between the input string and each respective candidate string. The string matching means also is for determining a guaranteed portion of the candidate strings for inclusion in the ranked search results using a guaranteed rank threshold that is calculated based on self-information weights from the index regarding the one or more input features. The guaranteed portion of the strings have a similarity metric greater than the guaranteed rank threshold. The search interface means presents to a user the ranked search results comprising the guaranteed portion.

A number of feature refinements and additional features are applicable to the third aspect. These feature refinements and additional features may be used individually or in any combination. As such, each of the following features that will be discussed and any of the foregoing features of the first or second aspects may be, but are not required to be, used with any other feature or combination of features of the third aspect.

For instance, as described above, the string matching analysis used in the search module may facilitate improved efficiency over previously proposed approaches by providing robust results while calculating a relatively few similarity metrics between an input string and strings to be searched. Specifically, the guaranteed rank threshold approach facilitates the efficiency improvements while providing a listing of the top most relevant results from a collection of strings. As such, the search interface means may be a search-as-you-type interface that presents the ranked search results in response to each character input of the input string as provided by a user.

DETAILED DESCRIPTION

Figure 1:
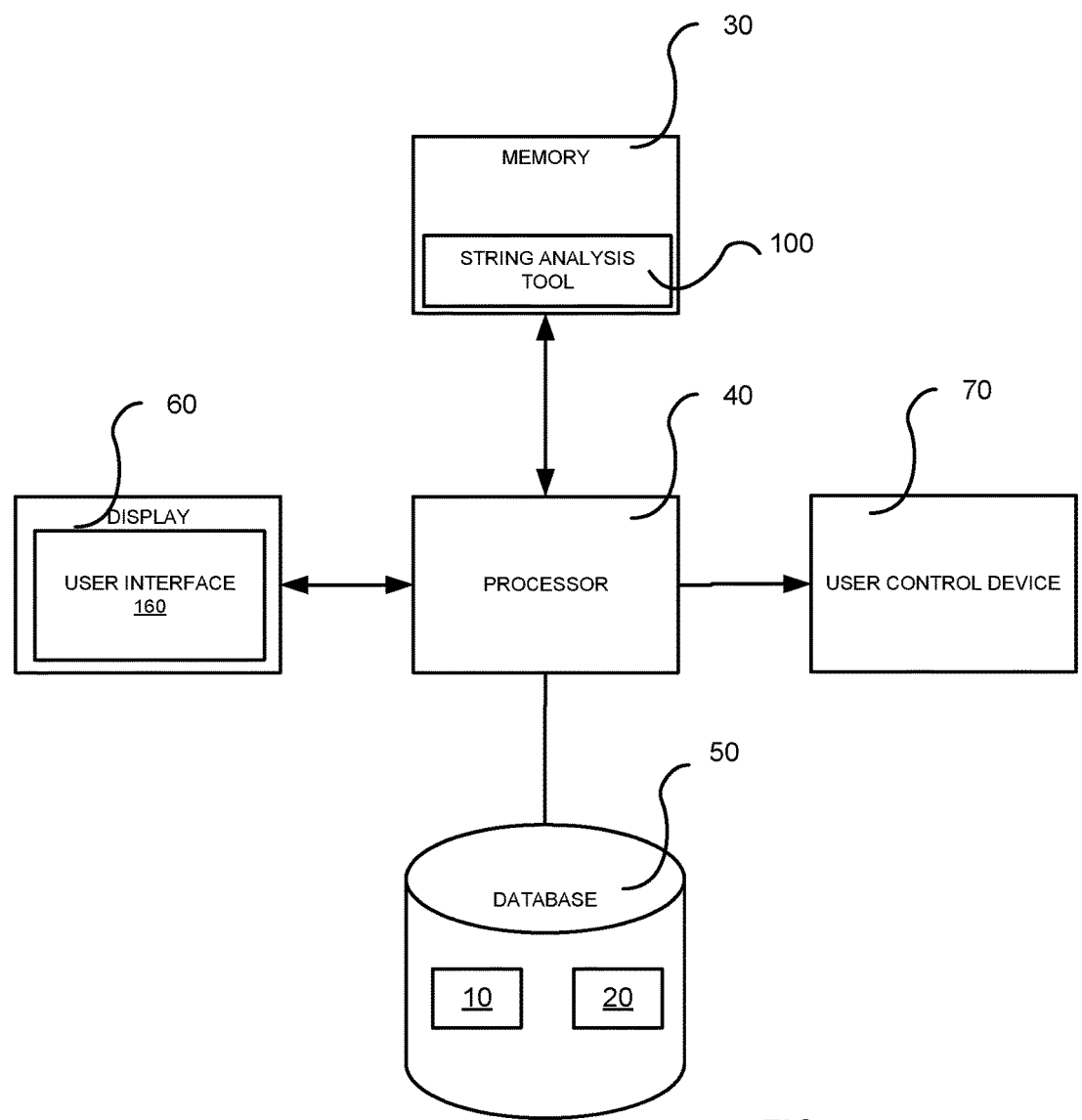
FIG. 1 depicts a schematic view of an embodiment of hardware associated with an embodiment of a search tool.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

The present disclosure generally relates to string analysis and implementations of string analysis for use in searching a collection of strings. Embodiments of a search tool for string analysis are described that provide techniques and optimizations that allow for fast implementation of search functionality even when searching a large collection of strings. In turn, even for extremely large data sets comprising a large number of strings, searching may be performed quickly and efficiently such that the computational resources needed to perform the search are minimized and results may be presented rapidly. For instance, the speed at which results may be returned using approaches described herein may be up to twenty-six times faster than conventional approaches. The speed at which the search may be performed may facilitate search-as-you-type functionality as will be described in greater detail below.

An approach to the calculation of a similarity metric may be utilized that may provide a quantitative value of relative similarity between an input string and one or more strings in the collection to be searched. In addition, approaches are described herein that selectively reduce the total number of times a similarity metric is required to be calculated when performing a search. As will be described in greater detail below, candidate filtering, feature index pruning, and/or a guaranteed rank threshold algorithm may be utilized in this respect. In turn, searches may be performed quickly such that highly relevant search results are returned in ranked order of similarity. In fact, implementations described herein may facilitate returning near instant results that facilitate a search-as-you-type functionality in which new results are returned as each new character is provided in an input string.

In various embodiments, the collection of strings may correspond to different types of data. For example, the strings may comprise text, numbers, signals, or other data. In an embodiment, the strings may correspond with textual characters such as standard ASCII characters (e.g., including alphanumeric characters and symbols). For example, the strings may correspond to product information (e.g., product information contained in legacy databases maintained by businesses). In other embodiments, the strings may represent or correspond to a plurality of other data sources and/or contexts such as documents, web pages, biological sequencing (e.g., DNA sequencing), random data sets, scientific data, directory information, or any other context where a collection of strings is to be searched using a search query.

Generally, the string analysis performed by embodiments of the search tool described herein may be used to determine the similarity (e.g., a quantitative similarity metric) between an input string and one or more strings from a collection of strings to be searched. For example, an input string and a string from a collection that are completely identical may have a similarity metric of 100% or 1, while an input string and a string from a collection that are completely dissimilar may have a similarity metric of 0% or 0. As will be appreciated in the discussion below, the string analysis described herein may be particularly suited to enable search functionality of the search tool.

With reference to FIG. 1, an embodiment of a hardware environment is shown that may be used to execute an embodiment of a computer-based search tool 100 described herein. In this regard, a processor 40 may be provided that is in operative communication with a memory 30. The memory 30 may store one or more modules comprising the search tool 100 as will be described in greater detail below. In this regard, the search tool 100 and/or the modules comprising the search tool 100 may be stored as non-transitive computer readable instructions in the memory 30. The non-transitive computer readable instructions may be accessible by the processor 40 and capable of instructing a processor 40 to perform functionality associated with each module comprising the search tool 100 as described below.

The processor 40 may also be in operative communication with a display 60. Further still, the processor 40 may be in operative communication with a user control device 70. In this regard, the processor 40 may be operable to execute a user interface 160 including a display portion displayed on the display 60. Furthermore, the user control device 70 may be operative to receive user inputs in connection with the user interface 160. As such, the user interface 160 may, at least in part, allow a user to interact or control the search tool 100.

The processor 40 may also be in operative communication with a database 50. The database 50 may be operative to store, for example, input content 10 and/or collection content 20 for use in a string analysis as will be described in further detail below. In addition, the database 50 may store additional data including, for example, information regarding strings and/or features, probability data regarding strings and/or features, weighting parameters regarding strings and/or features, an index, or other data that may be employed in the string analysis.

Figure 2:
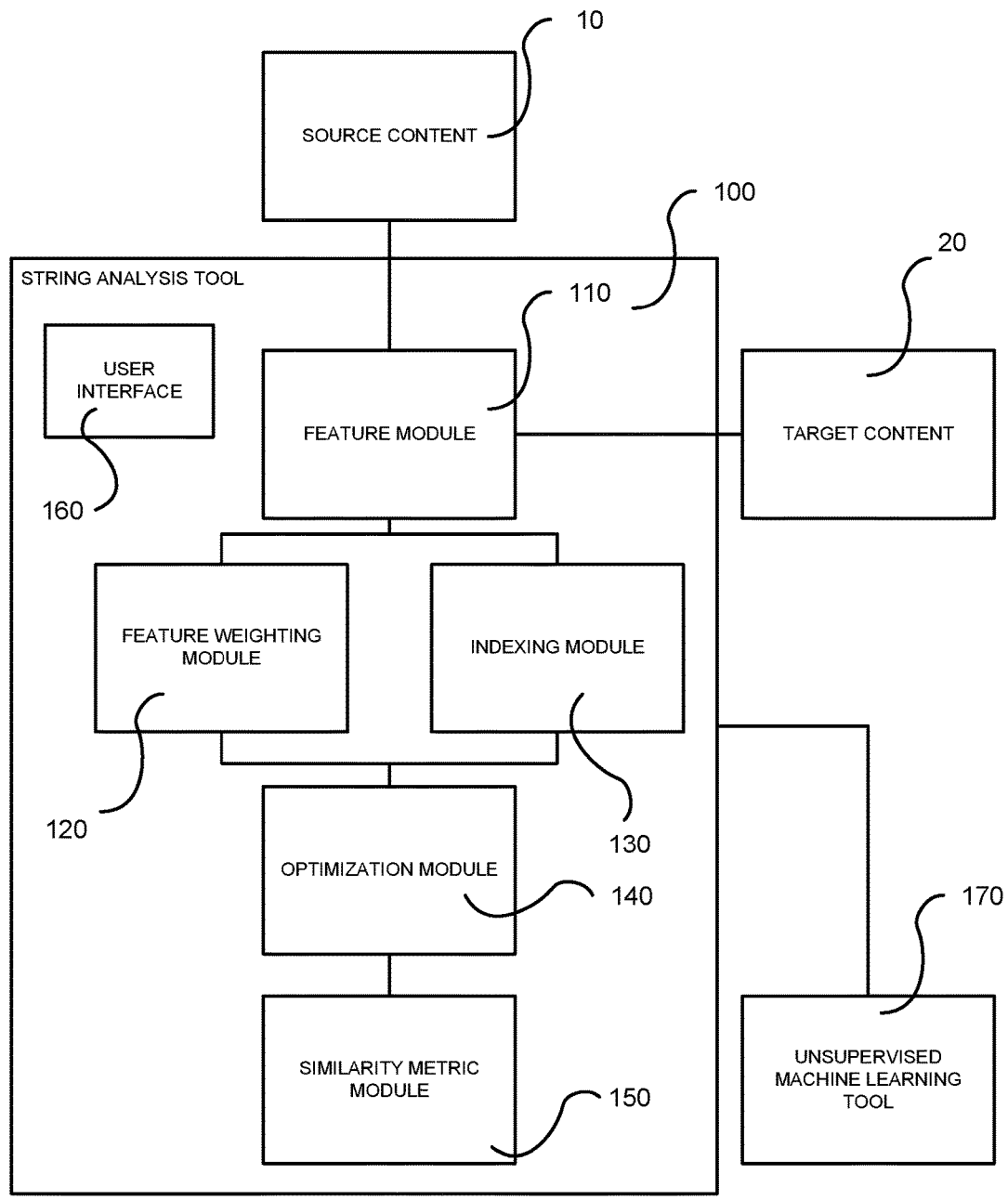
FIG. 2 depicts a schematic of an embodiment of a search tool.

With reference to FIG. 2, an embodiment of the search tool 100 is depicted. The search tool 100 may comprise one or more components that may function to perform one or more different aspects of the string matching search analysis described herein. As may be appreciated, the components described herein may correspond to one or more hardware or software modules capable of performing functions as described below. It may also be appreciated that while addressed separately for clarity, one or more components may be consolidated into a single component. Furthermore, additional distinct modules may be provided in addition to those described below.

Returning to FIG. 2, the search tool 100 may generally include a feature generation module 110, a feature weighting module 120, an indexing module 130, and an optimization module 140. The following description will contain a description of each module. Thereafter an exemplary analysis process is described to facilitate searching a collection of strings using the search tool 100.

The feature generation module 110 may be operable to represent strings (e.g., either or both of strings from a collection to be searched as well as an input string) as a set of features. A feature may be any characteristic of the string that can be derived from the string or the data record from which the string is drawn. In this regard, a feature may leverage metadata associated with a string. The feature generation module 110 may be operable to access input content 10 (e.g., including an input string or a portion thereof corresponding to a user's search query) or collection content 20 (e.g., including strings in a collection and/or portions thereof). The input content 10 may include or be operable to receive a search query from a user by way of the user interface 160.

With respect to the input content 10 and/or collection content 20, as described above, the input content 10 and/or collection content 20 may include strings representing a variety of different data types and/or data sources. In one embodiment, the input content 10 and/or collection content 20 may include textual data as described above. For example, the textual data may be representative of business data such as, for example, product descriptions, electronic catalogs, stock keeping data, accounting data, marketing data, or other textual information relating to the business. Additionally or alternatively, the textual data may include directory data that may include, for example, names, emails, phone numbers, addresses, or other information. Further still, the textual data may be representative of one or more websites that may include metadata associated with a website. In this regard, any textual information may be provided for utilization with the string analysis tool 100.

In one embodiment, the feature generation module 110 may be operable to represent strings as character n-grams, where each character n-gram corresponds to a feature. Character n-grams are fixed-width sequences of contiguous characters. Character n-grams may be easy to compute, domain independent, and particularly suited to the context of text matching.

For example, one example of an n-gram that may be used to generate features is a trigram. A trigram has a fixed-width sequence of three characters. Additionally, begin-of-word and end-of-word markers may also be used. Thus, a string may be represented by a plurality of features corresponding to successive three character sequences of the string. For example, consider the string "RES 10 OHM ¼ WATT 5%." The string may be represented by a plurality of trigrams as follows: <B>re, res, es<E>, <B>10, 10<E>, <B>oh, ohm, hm<E>, <B>¼, ¼, /4<E>, <B>wa, wat, att, tt<E>, <B>5%, 5%<E>, where <B> indicates a begin-of-word and <E> indicates an end-of-word in the feature. As may be appreciated, the representation of the string as n-gram features may be domain independent such that the feature generation may be applied without deference to the source or form of the data of the string. As such, it may be appreciated that feature generation may be applied to a variety of domains quite easily. The flexible architecture, however, also allows for fine-tuned customization for a given domain or data set. Moreover, other variations of n-grams may be used as features such that n may be 2, 4, or some other integer value. Additionally or alternatively, other features may be used such as words, character prefixes or suffixes, or arbitrary features such as consonant n-grams (that are created by first removing the vowels from a string), or some other combination of features.

In an embodiment, the feature generation module 110 may be operable to represent a string as one or more features based on a word-level token found in a string. For example, the generation of features may leverage domain-specific knowledge. One example may be utilizing knowledge of how product part numbers or telephone numbers are constructed. In this regard, a listing of ten-digit telephone numbers may utilize a known rule that the first three digits represent the area code for the number. Thus, the first three digits of each number may be used to generate a feature corresponding to the area code. The remainder of the number may be processed utilizing, for example, a different feature representation, such as an n-gram or other feature with the understanding those numbers may be random or lack the underlying meaning attributed to the area code. Additionally or alternatively, linguistic knowledge, taxonomy, grammatical, syntax, or other schema data may be used to generate features. Accordingly, features may reflect heuristics for common abbreviation strategies, textual structure features, or other linguistic knowledge may be used to represent strings as features.

The search tool 100 may also include a feature weighting module 120. The feature weighting module 120 may be in operative communication with the feature generation module 110. As such, the feature weighting module 120 may be operable to receive the features generated by the feature generation module 110 based on the input content 10 and/or collection content 20. The feature weighting module 120 may be operable to provide each feature a weight that is used to determine how much a feature contributes (or does not contribute) to the string analysis. Examples of feature weighting may include, but are not limited to, giving each feature a score of 1.0 such that each feature contributes equally in the analysis, using frequency information regarding the feature from the input content 10 and/or collection content 20 to weight the feature (e.g., using the negative log of the probability), or using the frequency rank of the feature. One particular example of a weighting technique may include using a beta distribution over the frequency rank. In this context, high frequency features are given very little weight as the high frequency features tend to be uninformative. Very low frequency features may also be given very little weight because they tend to be noisy. As a result, a feature having a frequency below an upper threshold and above a lower threshold may be given a relatively large weight as those features may be informative and less prone to noise than high and low frequency features, respectively.

For example, when the strings of the collection include documents (e.g., news articles, scholarly papers, or other plain language documents), a trigram feature "the" may have a very high frequency in the strings. That is, the term "the" may appear very often in the documents. However, the appearance of the term "the" may be very uninformative regarding the similarity of a string containing the feature "the" and an input string containing the feature "the" due to the high frequency in the documents to be searched. On the other hand, a feature "<B>z<E>" may have a very low frequency in the documents. However, the existence of the feature "<B>z<E>" in the documents may be subject to noise such that the appearance of the feature in the documents may also be uninformative as to the similarity of an input string containing the feature "<B>z<E>" and a string in the collection to be searched containing the feature "<B>z<E>". Thus, both features "the" and "<B>z<E>" may be given relatively low weights in the string analysis performed by the tool.

The tool embodiment 100 may also include an indexing module 130. The indexing module 130 may be in operative communication with the feature generation module 110 so as to receive the representations of strings in the collection as features per the operation of the feature generation module 110 as described above. The indexing module 130 may be operable to calculate an index containing each feature of a string or collection of strings. For example, an inverted index relating features to the plurality of strings in the collection to be searched may be created such that a mapping from each feature to every string in the collection that contains that feature is established. In this regard, the index may provide information regarding the relationship between a feature and one or more strings containing that feature (e.g., include a mapping between features and every string in a plurality of strings in the collection to be searched that includes a given feature).

In addition, the index may be used to generate information regarding the features contained in the index (e.g., including self-information weights for the features). For instance, the feature index may be used to select candidate features for consideration in a similarity metric calculation from the features found in an input string. This ensures that only strings from the collection that have a positive similarity score are considered. That is, only strings in the collection to be searched with a feature common with the input string are considered. The distribution of features in the index tends to be Zipfian, e.g., there may be relatively few high-frequency features and relatively many low-frequency features.

As stated above, each feature in the index may have a self-information weight calculated for the given feature. This self-information weight may be calculated based on the probability of a feature appearing in a string in the collection to be searched. In this regard, features in the index may be sorted based on frequency of appearance in the strings to be searched and/or the value of the self-information weights for the respective features.

For instance, there are typically a relatively small number of features that are found in large numbers of strings in the collection and produce large numbers of low scoring string candidates. String candidates selected by high-frequency features that in fact have high similarity scores usually share low frequency features with the input string and thus can be collected by means of those low frequency features. Additional approaches to optimize candidate selection without compromising the search results that would be obtained by a brute force approach are discussed in greater detail below.

The search tool 100 may also include a similarity metric module 150. The similarity metric module 150 may be operable to calculate a similarity metric that describes the similarity between an input string and one or more strings from a collection of strings. As discussed above, the similarity metric may be an intuitive similarity score between an input string and a string from the collection of strings to be searched that ranges between 0% (or 0) and 100% (or 1). In this regard, a perfect overlap of the input string and a string from the collection may result in a similarity metric of 100% or 1, whereas no overlap between the input string and the string of the collection may result in a similarity metric of 0% or 0. Calculating the similarity metric for a given input string and a string from the collection may include calculating a similarity metric based on commonality of features between the input string and the string from the collection using the feature representation described above with respect to the feature generation module 110 for each string pair that is to be compared. In this regard, the similarity score may be computed by observing features that are shared between the input string and strings in the collection and/or by observing features that are present in the input or strings of the collection, but that are not shared. As discussed in greater detail below, the commonality and dissimilarity of strings may have relative weights in calculating the similarity metric.

Any one or more of a plurality of different similarity metrics known in the art may be employed. Examples include, but are not limited to, weighted average as a ratio of feature weights in common over all features, the Jaccard similarity index, a Bayesian approach that computes the probability of having features in common, etc. Further examples of potential similarity metrics that may be employed are discussed in Dekang Lin, *An Information-Theoretic Definition of Similarity*, ICML '98 Proceedings of the Fifteenth International Conference on Machine Learning, Morgan Kaufmann Publishers Inc., San Francisco, 296-304 (1998), which is incorporated herein by reference in its entirety.

The tool 100 may also include an optimization module 140. As depicted, the optimization module 140 may be in operative communication with the feature weighting module 120 and the indexing module 130. The optimization module 140 may be disposed between the similarity metric module 150 and the feature weighting module 120/indexing module 130. As such, the optimization module 140 may be operable to perform a number of optimizations relative to the features of the input string and/or strings of the collection undergoing analysis. The optimizations performed by the optimization module 140 may reduce the computational resources required to compute similarity metrics between an input string and a plurality of strings in a collection of strings. For example, a brute force approach to string searching a collection of strings is to loop over every string in the collection of strings and calculate a similarity metric for each string in the collection. Calculating the similarity metric may be relatively fast when carefully optimized by precomputing the self-information weights for each feature in the index as described above, sorting the features in the index, and computing the self-information weight of the input string features only once. However, this approach is still wasteful because strings that do not have any features in common will be compared to each other. Thus, the approaches described above in which only strings with a feature in common with an input string are used to calculate the similarity metric.

Furthermore, the optimization module 140 may provide a more efficient process for determining similarity metrics by reducing the number of similarity metrics that must be calculated for any given analysis between an input string and a plurality of strings in a collection to be searched. In this regard, the optimization module 140 may be operable to filter input features used in generating a similarity metric, prune features from the index, and/or use a guaranteed rank threshold algorithm. It may be appreciated from the following discussion that any or all of these approaches may reduce the processing overhead expended by the similarity metric module 150 associated with the generation of similarity metrics between an input string and a collection of strings to be searched.

For instance, once an input string is received, a first optimization performed by the optimization module 140 may be a candidate filtering approach that allows eliminating consideration of input features from the index used to calculate the similarity metric. For example, as described above, in the context of textual string searching, the distribution of the features in the strings tends to be Zipfian. In turn, high frequency features may have low self-information weights that may not contribute significantly to the similarity metric in view of the high frequency of the features. In turn, establishing a minimum similarity metric may allow for determining features in the input string that may be ignored given the features are incapable of contributing to a similarity metric above the minimum similarity metric.

The optimization module 140 may utilize the known frequency distribution or self-information weight obtained from the index such that string candidate look up for high frequency features may be eliminated by establishing the minimum similarity metric threshold. In turn, the number of features from the input string that must be queried in order to guarantee that there will be no strings from the collection missed that have a similarity metric above the minimum similarity metric threshold may be calculated. Accordingly, once this calculated value related to the number of features needed to be queried to only return strings from the collection having a similarity metric above the minimum similarity metric threshold is known, it may be used to eliminate the most frequent features of the input string from consideration such that the number of string candidates from the collection of strings may be greatly reduced. That is, given a reduction in the number of input features, a decrease in the number of strings from the collection that may be returned having at least one feature matching the input feature may also occur. While an exemplary approach to this optimization technique may be described in detail below, it will be understood that this approach may be applied to a wide variety of different kinds of features, feature weighing schemes, and similarity metrics that may be employed as alternatives to the specific techniques outlined below.

One exemplary application of a technique to reduce the number of input features considered is described below. The technique generally begins with a similarity metric defined as:

$$sim(r, s) = \frac{2I(r \cap s)}{I(r) + I(s)} \qquad \text{Equation 1}$$

Where r represents an input string and s represents a string from the collection. As such, $I(r \cap s)$ is a function that returns the sum of the self-information weights of the features common to r and s. The functions $I(r)$ and $I(s)$ represent the self-information weights of the features of the input string r and string from the collection s, respectively. As such, in Equation 1, the values for the self-information for features in r may be expressed as $I(r)$ and the self-information weight of features in s may be expressed as $I(s)$, which are calculated as:

$$I(r) = I(F(r)) = \sum_{f \in F(r)} -\log P(f) \qquad \text{Equation 2}$$

-continued $$I(s) = I(F(s)) = \sum_{f \in F(s)} -\log P(f) \quad \text{Equation 3}$$

where F(r) and F(s) represent some function for converting an input string r or a string from a collection s into a set of features such as those described above in relation to the feature generation module 110. In addition, P(f) is the probability of a feature which can be calculated by dividing the number of times a feature appears in the strings of the collection by the total number of instances of all features.

Equation 1 above may be rewritten to include weighting parameters relative to the input features or collection features as mentioned above. As such, Equation 4 may be derived:

$$sim(r, s) = \frac{I(r \cap s)}{w * I(r) + (1-w) * I(s)} \quad \text{Equation 4}$$

Where w is an input weight parameter. In Equation 4, the input weight parameter is utilized relative to the self-information weights of the input string and strings from the collection so that the values behave as a weighted average such that the input weight parameter and the collection string weight sum to 1.

In turn, an optimization technique described above where input features are removed from consideration (i.e., candidate filtering) may be employed with respect to Equation 4. As an initial step, Equation 4 may be rewritten as an inequality that defines the minimum score threshold that defines which features in the input string that can be disregarded. Note that a string from the collection maximally contributes to the similarity metric when every feature in the strings from the collection is also found in the input string. When this condition is met, the numerator in Equation 4 is equal to I(s) such that:

$$\tau \leq \frac{I(s)}{w * I(r) + (1-w) * I(s)} \quad \text{Equation 5}$$

In this regard, rather than calculating Equation 4 for each input string/collection string pair, Equation 5 may be used to determine which input features may be eliminated based on a minimum similarity metric threshold T. It may be known that the term I(r) will not change for each input string/collection string pair because I(r) is dependent only on the input string. While the value of I(s) cannot be calculated because it may be different for every input string/collection string pair, Equation 5 may be solved for I(s) to render:

$$I(s) \geq \frac{\tau * w * I(r)}{1 - \tau(1-w)} \quad \text{Equation 6}$$

Equation 6 represents that I(s) must be greater than a term containing the minimum score τ, input weight w, and I(r) in order for s to have any possibility of having a similarly score with r that is higher than τ. Accordingly, when the input features are used to select candidate features from the collection of strings, the candidate features must satisfy Equation 6 in order to be considered.

In turn, one potential strategy is to sort the features in the index in order of descending frequency in the collection of strings. A sum of the information of the features in order may be calculated such that the sum satisfies Equation 6. The remaining (and more informative) features are then used to gather candidate strings from the collection of strings such that a similarity metric is only calculated between the input string and each of these candidate strings determined from the index that share a feature.

One example of the foregoing optimization technique may be applied for a collection of strings that have the following features whose respective information calculations are:

| Feature | P(F) | I(F) |
|---------|---------|-------|
| F1 | 0.00001 | 16.61 |
| F2 | 0.0001 | 13.29 |
| F3 | 0.001 | 9.97 |
| F4 | 0.01 | 6.64 |
| F5 | 0.1 | 3.32 |

Now, suppose an input string (r) has the following features F(r)={F1, F3, and F5} and one of the strings of the collection ($s_1$) has the following features F($s_1$)={F5}. The similarity of r and $s_1$ is (assuming w=0.5):

$$sim(r, s_1) = \frac{3.32}{0.5 * 29.9 + 0.5 * 3.32} = 0.20$$

Assume another string of the collection ($s_2$) that has the following features F($s_2$)={F1, F3, F4}. The similarity of r and $s_2$ is:

$$sim(r, s_2) = \frac{26.58}{0.5 * 29.9 + 0.5 * 33.22} = 0.84$$

There is a high probability of similarity between r and every string in the collection that contains F5 (e.g., as much as 10% of the corpus if F5 never occurs twice in the same string). As may be appreciated, this represents a very high utilization of computational resources that may return only very small, uninformative similarity metrics. In contrast F3 and F5 may require calculating the similarity on 0.1% and 0.001% of the collection, respectively. Thus, using F5 to gather up candidates is both expensive and rather pointless (contrast the 20% similarity with the 84% similarity). So, a minimum score threshold of τ=0.5 may be established to remove from consideration the feature F5.

Another optimization technique that may be employed by the optimization module 140 may be to establish a minimum similarity metric threshold as a parameter used to remove feature-to-string mappings from the index after the index has been created (i.e., feature index pruning). For example, the number of features that must be mapped in order to guarantee that there will be no string candidates from the collection missed for a given minimum similarity metric threshold may be established. Once the calculated value associated with the minimum similarity metric threshold is known, it may be used to remove feature-to-string mappings from the index. Again, while an exemplary approach for removal of feature-to-string mappings from the index is described in detail below, it will be understood that this approach may be applied to a wide variety of different kinds of features, feature weighing schemes, and similarity metrics that may be employed as alternatives to the specific techniques outlined below.

As stated above, the strings from the collection may be represented in the index containing mappings between features and strings and may be examined to determine which features are not to be mapped in the index for a given minimum score threshold and input string weight (e.g., as established by the feature weighting module 120). In this regard, feature-to-string mappings may be removed from the index such that corresponding strings from the collection having only features that have been removed from the index may not be returned as candidate strings for which a similarity metric is calculated. In this approach, it is noted that r maximally contributes to the similarity metric when every feature in r is also found in s. When this condition is met, the numerator in Equation 4 may be set to I(r) and may be used to establish the inequality:

$$\tau \leq \frac{I(r)}{w*I(r) + (1-w)*I(s)} \qquad \text{Equation 7}$$

Now Equation 7 may be solved for I(r) which results in:

$$I(r) \geq \frac{\tau*(1-w)*I(s)}{1-\tau*w} \qquad \text{Equation 8}$$

Equation 8 may now be used for determining minimum required value of I(r) such that τ has any chance of being greater than the provided minimum similarity metric threshold. Given the calculated minimum value of I(r), features of the strings of the collection (s) that can be eliminated from the index can be identified. One strategy is to sort the features of s in order of descending frequency. The information of the features in that order may be summed such that the sum does not exceed the value of I(r) that was calculated. Accordingly, the remaining (and more informative) features are left in the index for consideration in the calculation of similarity metrics between an identified input string and the strings of the collection based on the pruned index where features have been removed as per the foregoing. To generalize the operation of this optimization, the smaller the value of w (the weight parameter for the input string) the more features can be removed the index. Similarly, the larger the value of τ, the more features can be pruned from the index.

Returning to FIG. 2, the search tool 100 may include a user interface 160. The user interface 160 may include a display and/or input devices through which a user may interact with the search tool 100. In this regard, various elements of the foregoing description may be controllable by a user via interaction with the user interface 160. For example, identification and/or receipt of an input string may be provided by a user via the user interface 160. Furthermore, predetermined values such as the minimum similarity metric threshold may be input by the user via the user interface 160. Furthermore, the string similarity output and/or search results obtained using the string analysis tool 100 may be displayed to the user via the user interface 160.

The foregoing optimizations all include subjectively determined parameters utilized to reduce the computational overhead required to perform string matching to produce search results. In this regard, the approaches require string matching application developers to determine the appropriate parameters to achieve a desired balance between speed of computation of the string similarity metrics and the number of features and strings analyzed. For instance, with an increase in the required minimum similarly metric, the search speed is improved as additional candidates may be filtered or more features may be pruned from the index. However, setting a minimum similarity metric is a poor proxy for what is often desired: to get back a given number of "top" results (i.e., the results from a collection of strings that most closely match the input string as reflected in the similarity metric for the strings in the collection). By increasing the minimum similarity metric, the probability of returning to the user the desired number of top results goes down because there may not be a sufficient number of results that exceed the minimum similarity metric established.

In turn, a further approach to string analysis is provided herein that exploits both a minimum similarity metric and a maximum results parameter to reduce the tension between an overly constrictive minimum similarity metric and providing meaningful results. In addition, the approach described below also significantly improves performance in most cases. For a given input string, a minimum similarity metric, and a maximum number of results, a string similarity search is performed according to the following.

Initially, the input features of the input string are sorted by increasing frequency and candidate strings from the collection of strings to be searched are gathered for each input feature in turn and scored according to Equation 4 provided above. The candidate strings that contain the selected input feature are retrieved using the index and a similarity metric is calculated for the candidate strings containing the input feature. The candidate strings are ranked from the largest similarity metric to the smallest similarity metric. For each input feature, a guaranteed rank threshold (GRT) is calculated. The calculation of the GRT may be iterative such that at each iteration an additional feature from the sorted input feature list is added for consideration of the GRT. The GRT may be calculated as:

$$GRT \leq \frac{I(r) - \sum_{n=1}^{i} I(f_n)}{w*I(r) + (1-w)*\left(I(r) - \sum_{n=1}^{i} I(f_n)\right)}. \qquad \text{Equation 9}$$

As may be appreciated, Equation 9 is Equation 5 described above used for candidate filtering. However, rather than providing a condition in which the numerator is equal to I(s) to establish the minimum similarity metric when s maximally contributes to the similarity metric when every feature of s is also found in r, Equation 9 utilizes a term that represents the optimal value of I(s) for a candidate string that does not have any of the input features that have yet to be iterated over. That is, the optimal value for such a string candidate is I(r) reduced by the sum of the self-information weights of all of the features of the ranked listing of input features that have been considered in previous iterations.

As each iteration of calculating the GRT is determined, the value of GRT is reduced at each iteration. This may be appreciated in the fact that the numerator reflects the difference between the self-information weight of the input string and the sum of the self-information weights of all the features that have been used in the iteration, while the denominator includes a weighted sum of these values. As such, the denominator increases with each subsequent iteration such that the value of GRT is reduced.

Figure 3:
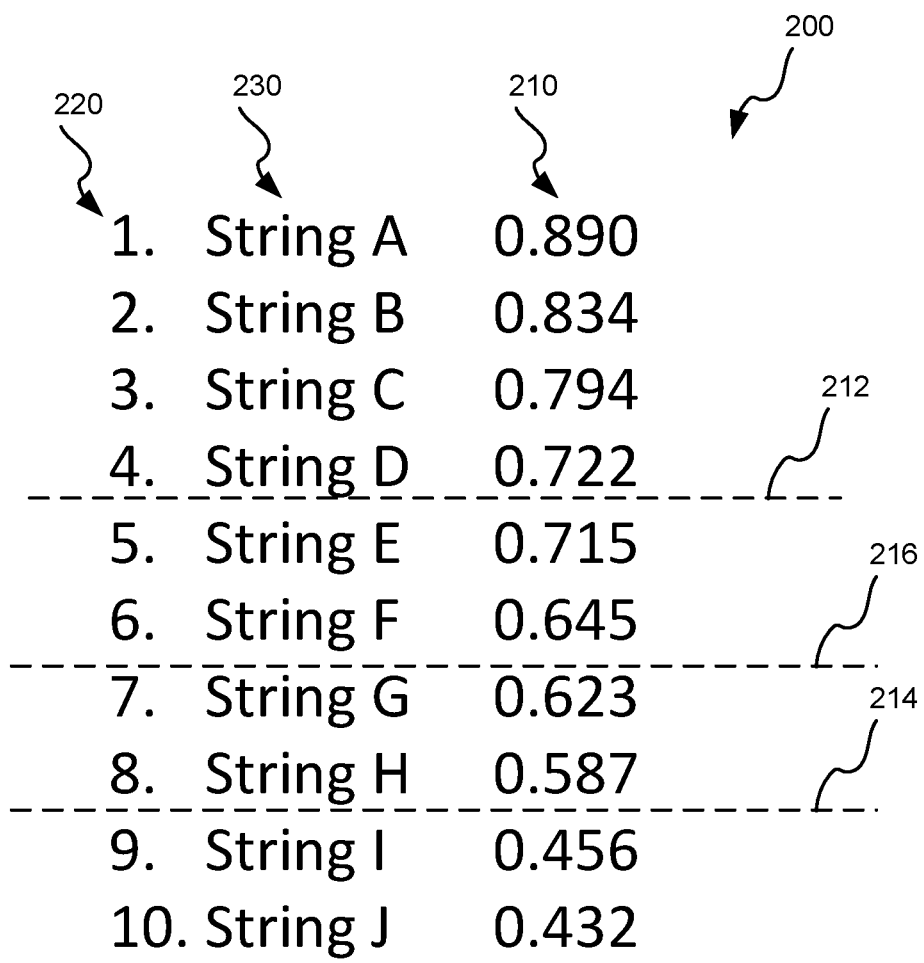
FIG. 3 depicts a portion of strings in relation to an embodiment of a search optimization technique for applying a guaranteed rank threshold algorithm.

A graphical representation of this iterative process is described in relation to FIG. 3. In FIG. 3, an ordered list 200 of ten strings from a collection to be searched containing the input feature used to generate a GRT in a first iteration are provided. In this case, ten strings are shown, but it may be appreciated that more or fewer strings may be retrieved based on the input feature searched and the depiction in FIG. 3 is for illustration only. Each retrieved string containing the input feature considered are provided in the ordered list 200. In FIG. 3, the similarity metric 210 for each string is shown along with a rank 220 and a string descriptor 230.

In the example depicted in FIG. 3, a first iteration GRT of 0.718 may be obtained using Equation 9. This first iteration GRT 212 is represented in FIG. 3 as a dotted line relative to the list 200. In this regard, String A, String B, String C, and String D each have a similarity metric 210 that exceeds the first iteration GRT 212. In this regard, these four strings are added to a guaranteed portion of strings and the designated rank 220 of these strings is guaranteed to be final in the search results. The strings falling below the GRT may be added to a potential portion of strings whose inclusion and rank are conditional on further iterations.

In addition, a minimum similarity metric 214 of 0.5 may be established in the example depicted. The minimum similarity metric 214 is represented as a dotted line relative to the list 200. Accordingly, String I and String J fall below the minimum similarity metric 214 and therefore will not be returned in the search results.

A second iteration that includes consideration of the next less frequent feature of the input string is performed. In this regard, the process of the first iteration may be repeated where strings from the collection containing the first input feature and the next input feature are retrieved, a similarity metric 210 is calculated, and the results are ranked. While a static listing of strings is depicted in FIG. 3, it may be appreciated that additional strings may be provided in the list 200 in subsequent iterations as new input features are considered and additional candidate strings are retrieved that contain the new input features considered.

In any regard, a second iteration GRT 216 may be calculated during the second iteration. This second iteration GRT 216 is represented as dotted line relative to the string listing 200. For instance, the second iteration GRT 216 may be calculated as 0.625. In this regard, String E and String F now exceed the second iteration GRT 216 and are therefore added to the guaranteed portion of the search results such that the rank 220 is guaranteed in the final results.

In turn, the iterations may continue by addition the next least frequent feature from the input string into each iteration. As may be appreciated, the GRT will be reduced at each iteration. As such, the iteration may continue until the GRT calculated for an iteration falls below the minimum similarity metric 214. For instance, if the GRT for an iteration falls below 0.5 in the example shown in FIG. 3, the iteration may terminate and strings exceeding the minimum value may be returned in the guaranteed rank in the results to be presented to the user.

Alternatively, the iterations may continue over each of the input features from the input string until a maximum number of search results are provided in the guaranteed portion of strings or the set of input features are exhausted. For instance, if the maximum number of search results is 10, the iterations may continue until 10 results are provided in the guaranteed portion of strings whose rank is guaranteed by exceeding the GRT. As may be appreciated, the example provided of 10 results is merely illustrative, and the actual maximum number of search results may be a parameter that is provided by a search tool designer that may vary over any integer value without limitation.

Alternatively, once the input features are exhausted, there may be strings in the potential portion that fall below the GRT, but above the minimum similarity score. For instance, if the iteration were to terminate after the second iteration shown in FIG. 3 as having iterated over all input features, String G and String H would still fall below the second iteration GRT 216 and above the minimum similarity score 214. As such, the strings in this potential portion of strings would be returned in the rank provided after completing the iteration as results.

Accordingly, for each iteration, ranked candidate strings from the collection whose similarity metric is above the GRT are added to a group of guaranteed search results. The rank of these results is guaranteed to be provided in the final results. The rank of these candidates is guaranteed to be final because it is not possible for a candidate string that does not have one of the features from the ranked features visited in previous iterations to have a similarity score higher than the GRT. That is, as each subsequent candidate feature is added to the summation of Equation 9, the GRT will get smaller, so that any further candidate strings added by virtue of a further iteration will have a lower similarity score than the subset of guaranteed candidate strings from a prior iteration. The final rank of candidates whose similarity score falls below the GRT, but above the minimum similarity metric is unknown and such candidates can only be added to the final ranked results in a subsequent iteration where the GRT gets smaller or if all features have been iterated and the maximum number of results have not been reached by guaranteed results.

Figure 6:
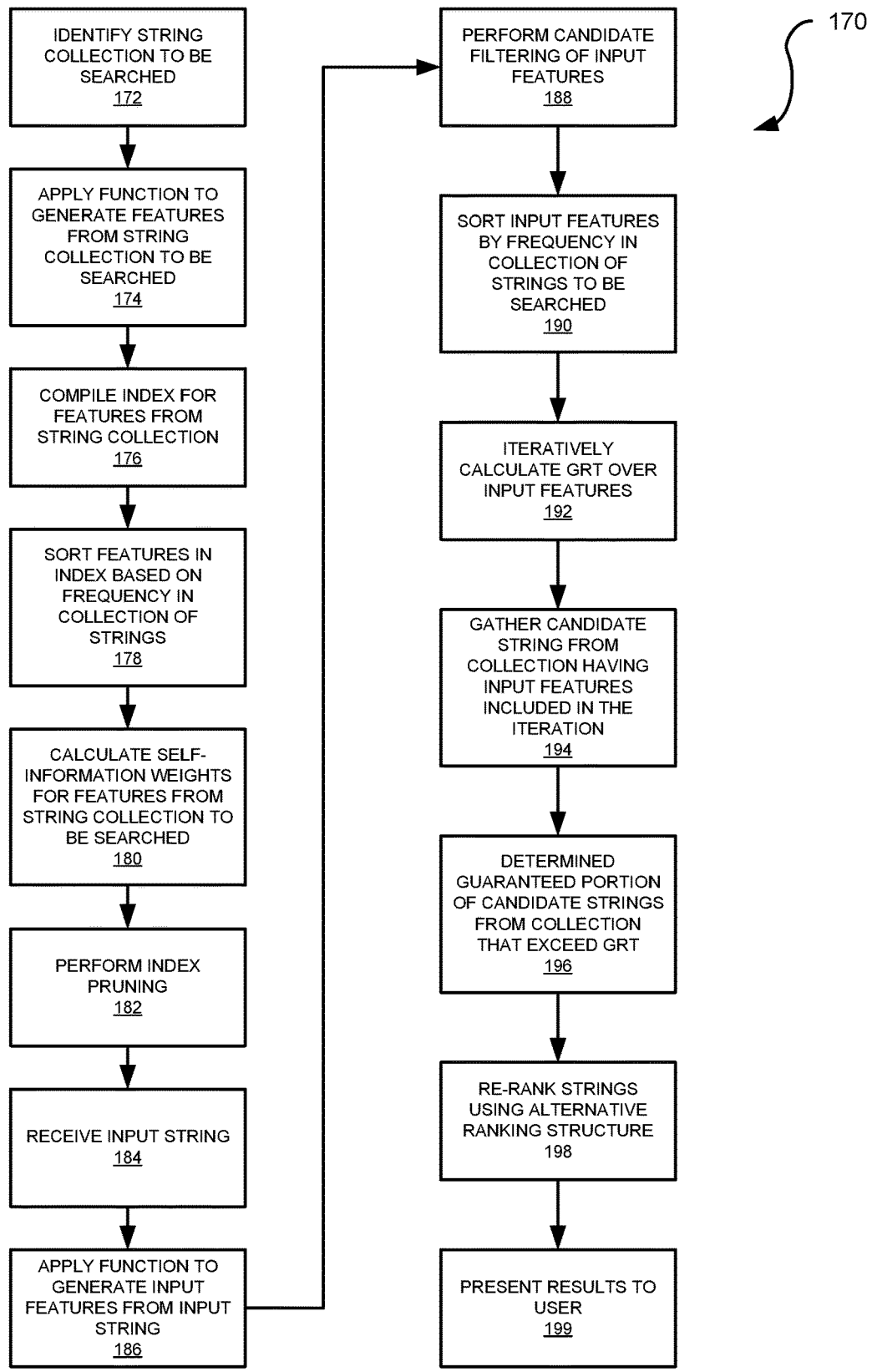
FIG. 6 depicts a flowchart of an embodiment of a method according to the present disclosure.

In this regard, a method 170 is depicted in FIG. 6 that may facilitate a string analysis based search of a collection of strings. The method 170 may include identifying 172 strings from a collection that is to be searched. As described above, the strings in the collection may correspond to textual data. However, in other certain contexts the strings of the collection to be searched may comprise any data representable in the form of strings.

The method 170 may include applying 174 a function to generate features from the strings in the collection of strings to be searched. As described above, one function that may be applied to the strings from the collection may include generation of n-grams. The method 170 may also include compiling 176 an index for features that have been generated from the collection of strings to be searched. The index may include feature-to-string mappings such that each string in the collection of strings to be searched that includes a feature may include a corresponding mapping to the indexed feature. The method 170 may include sorting 178 the indexed features based on the frequency of the indexed feature in the collection strings to be searched. For instance, the index may be sorted in ascending order of frequency relative to the features. This frequency may also be used to calculate 180 self-information weights for the features in the index.

A number of optimization techniques may be performed that may help to improve the performance of the search tool 100 when performed. For example, the method 170 may include performing 182 index pruning in which high-frequency features in the index may be removed therefrom based on the fact that the high-frequency features may not be operative to contribute to a similarity metric above a given minimum similarity threshold as described above.

The method 170 may also include receiving 184 an input string. For instance, the input string may correspond to all or a portion of a search query received from a user in connection with the search tool 100. As may be appreciated in the search-as-you-type context, the input string may refer to a completed search query entered by the user or may correspond to the portion of the search query entered by the user. That is, the searching provided by the method 170 may be performed in the search-as-you-type context even prior to receiving the full search query from the user. The method 170 may also include applying 186 a function to generate input features from the input string. As may be appreciated, the function applied to the input string may be the same as the function applied to the strings from the collection to be searched such that the form of the input features match the form of the features contained in the index.

Another optimization that may be performed in connection with method 170 is to perform 188 candidate filtering of the input features. That is, input features having a high-frequency in the index may be disregarded as the input features may not be operative to contribute to a similarity metric above a minimum similarity metric threshold.

The method 170 may also include sorting 190 the input features by frequency relative to the collection strings to be searched. That is, the input features may be sorted 190 based on the frequency with which the respective features appear in the collection strings to be searched. This may be based on the compiled index for the features corresponding to the strings to be searched. The sorting may be from the least frequent input feature to the most frequent input feature. In turn, the method 170 may include iteratively calculating 192 a guaranteed rank threshold (GRT). The iteration may begin using the least frequent input feature to generate the GRT. In turn, the method 170 may include gathering 194 candidate strings from the collection of strings to be searched that have features corresponding to the one or more input features included in the given iteration of the GRT calculation. The method 170 may also include determining 196 a guaranteed portion of these candidates strings from the collection of strings to be searched that exceed the GRT for the given iteration. In this regard, the candidate strings may be sorted based on a similarity metric generated relative to the candidate string and the input string. Thus, candidate strings that have a similarity metric greater than the GRT for the given iteration may be added to the guaranteed portion of strings such that the rank associated with the sorting of the candidate strings in relation to similarity metric may be guaranteed for the candidates strings whose similarity metric exceeds the GRT for the given iteration. As may be appreciated, after determining 196 the guaranteed portion of candidate strings for the given iteration, the method 170 may loop back to calculating 192 a new GRT for the next iteration considering the next most frequent input feature that appears in the index. Again, this process of iteration may continue until a maximum number of results is achieved, the GRT falls below the minimum similarity threshold, or all input features have been used in the iteration.

Once the iteration completes, the method 170 may include re-ranking 198 the strings to be returned to search results based on an alternative ranking structure. As will be described in greater detail below, the nature of the similarity metric utilized herein may provide a smooth range of similarity metric values from 0 to 1. In turn, alternative rankings (e.g., external metrics) for the strings in the collection to be searched (i.e., including independent rankings unrelated to any similarity to the input string) may be utilized to re-rank the results presented to a user. Examples of such re-ranking may include consideration of rankings or metrics of the strings in the collection to be searched. For instance, in relation to geographic locations, population rankings, distance to the user location popularity of the strings in other searches, or other ranking information related to the strings may be utilized. This is commonly applied in connection to searching product listings in which the price, popularity, or other quantifiable metric related to the product may be used to re-rank searches in the context of a product search.

In any regard, the method 170 may include presenting 199 the search results to a user. The presenting 199 may include presenting a ranked list of strings from the collection to be searched correspond to the input string provided by the user. As may also be appreciated, and a search-as-you-type context, the search functionality of the method 170 may be repeated with each new keystroke entered in relation to the input string such that the presentation 199 of results to the user may occur at each successive keystroke.

Returning to Equation 9, the input weight w may be adjusted for various applications of the string analysis tool 100. In the context of a search tool that employs search-as-you-type functionality, the input weight w may be set relatively high (i.e., near 1). This reflects a desire to reduce the penalty imposed on strings in the strings to be searched that include features not present in the input string. This is important especially in the context of a search-as-you-type approach as the input string may be searched even when incomplete (i.e., in a preliminary state prior to the user completing the desired search query). In such contexts, the fact that a string in the collection to be searched share features with the input string is more informative than the fact a string in the collection to be searched includes features other than those features in the input string. In this regard, the input weight w may be greater than the weight applied to features from the strings in the collection. That is, in the context of Equation 9, w may be greater than 0.5. Moreover, the input weight w may be at least twice the weight applied to features from strings in the collection (i.e., w may be 0.66 or greater). In yet other applications, the input weight may be at least about 0.9.

As described above, the similarity metric utilized herein for string searching may advantageously allow for efficient re-ranking of the results relative to an alternative ranking structure applied to the search results. As may be appreciated, the similarity metric derived for strings using Equation 6 may provide a globally adaptable score between 0 (for no similarity) and 1 (complete similarity). In turn, rather than an arbitrary metric, the result of the calculation of the similarity metric according to Equation 6 provides a relative metric for all strings between 0 and 1. This may be particularly useful in the context of re-ranking results. For instance, the results from a search of a collection of strings may be initially ranked based on similarity to an input string as described above. These results may have various similarity metrics ranging from 0 to 1 such that the returned strings may be ranked according to the similarity metric.

In addition, alternative rankings may also be provided for the collection of strings that may be used to re-rank the results. For instance, examples of alternative rankings may include relative popularity of web sites searched, population rankings for geographic locations searched, distances to relative geographic locations, relative popularity of products, or any other quantifiable ranking of the collection of strings to be searched. In this example, the alternative rankings may also be scaled to ranked values between 0 and 1, where strings near 1 represent higher ranked strings and strings nearer 0 represents the lowest ranked string. As such, the ranked results returned from the string analysis tool 100 may be re-ranked using these alternative rankings. For instance, the similarity metric for a string may be averaged with the ranking value for the string in the alternative rankings to achieve the re-ranking. Alternatively, the relative ranking values may be weighted such that, for example, the similarity metric is more highly weighted than the alternative ranking or vice versa.

Figure 4:
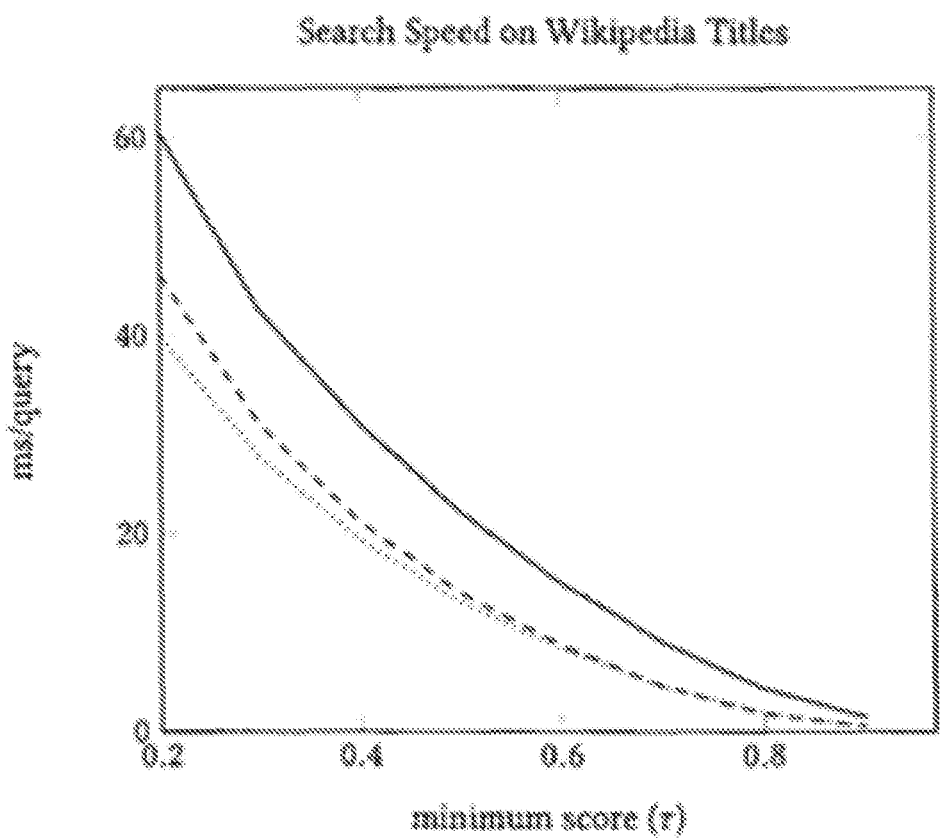
FIGS. 4 and 5 depict graphs showing search response times for various implementations of embodiments described herein.

The performance of the described approaches is evaluated on a Sun® Server X4-2L with 512 GB of RAM and a 2.6 GHz Intel® 1 Xeon® Processor E5-2650 v2. A feature index was built using 4,908,667 titles from the November 2015 dump of Wikipedia using character 4-grams as features. The feature index took less than one minute to build and prune. Ten thousand titles were randomly selected and searched. FIG. 4 shows the search speed at different levels of $\tau$ and with an input weight of 0.5 held constant. When $\tau=0$ the optimizations have no effect and the average search rate is 118.7 ms/query (not shown in the graph of FIG. 4). When $\tau=0.9$, the fastest search rate of 0.52 ms/query is observed. However, the average number of results that are returned is only 1.31 which is consistent with finding the input title plus occasionally another very similar title. The more useful minimum similarity metrics of $\tau=0.6$ and $\tau=0.7$ return an average of 12.0 and 5.6 results, respectively, and have rates of 8.37 ms/query and 4.54 ms/query, respectively, using a pruned feature index and a GRT-based search. Thus, the performance when $\tau=0.7$ is more than twenty-six times faster than when no optimization is performed.

A second experiment was performed on 183,933 person names drawn from a corporate directory listing that was expanded using variants derived from email addresses. This data set is used for a deployed application that provides directory search capabilities with search-as-you-type feedback. The system advantageously provides near instantaneous feedback and has robustness against misspellings, word order, and typos. In this context of a search-as-you-type approach, every time a user triggers a keystroke event, a round trip to a server containing an instantiated feature index is performed and search results are returned and presented using a GRT-based approach as described above. The features used are character n-grams of size three (n=3) and character prefix features of size one. Each keystroke-generated query may or may not be logged by the system. For instance, the keystrokes may be aggregated together within some small time span of a few seconds or when the user types 'enter.'

To simulate a collection of keystroke-generated queries, a list of logged queries was compiled and each query expanded into multiple queries by computing all possible sub-strings starting at the first character. For example, the query "Pat" may be expanded to three queries: "P", "Pa", and "Pat." A collection of 100,000 such queries was generated and used for comparing search speed for different levels of minimum score with and without the GRT approach.

Figure 5:
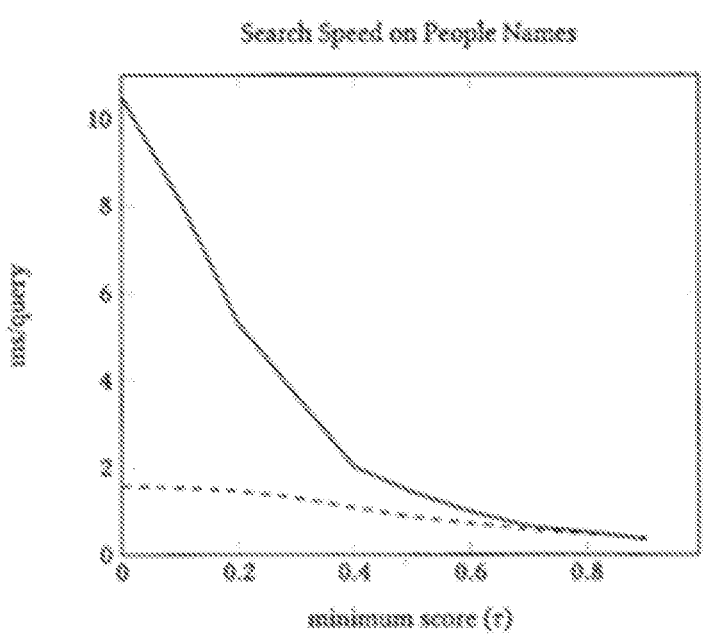

FIG. 5 shows the search speed at different levels of $\tau$ and with an input weight of w=0.99 held constant. Because the index pruning has very little impact when the input weight w is large, the index was not pruned here. When GRT-based searching is not used and only the minimum score based candidate filtering is used, the speed ranges from 10.53 ms/query for r=0.0 to 0.34 milliseconds/query for $\tau=0.9$. When GRT-based searching is used the speed ranges from 1.57 ms/query for $\tau=0.0$ to 0.38 ms/query for $\tau=0.9$. As can be appreciated, in certain contexts, the GRT algorithm may obviate the need to set the minimum score at all.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for generating ranked search results using string analysis executed by a computer-based search tool, comprising:
    compiling, using the computer-based search tool, an index comprising:
        a plurality of indexed features corresponding to features of a plurality of strings of a collection to be searched,
        a mapping between each respective one of the indexed features and corresponding respective ones of the plurality of strings in the collection containing the respective indexed feature, and
        a self-information weight for each of the indexed features based on the frequency of the indexed feature in the strings of the collection to be searched;
    receiving, using the computer-based comparison tool, an input string;
    representing the input string as one or more input features;
    selecting one or more candidate strings from the plurality of strings of the collection that have at least one of the indexed features in common with the one or more input features of the input string;
    calculating, using the computer-based search tool, a similarity metric for the input string relative to the candidate strings, wherein the similarity metric is at least partially based on commonality between the input string and each respective candidate string;
    determining a guaranteed portion of the candidate strings for inclusion in the ranked search results using a guaranteed rank threshold that is calculated based on the self-information weights from the index regarding the one or more input features, wherein the guaranteed portion of the strings have a similarity metric greater than the guaranteed rank threshold; and
    ranking the guaranteed portion of the candidate strings for presentation in the ranked search results according to the respective similarity metrics of the candidate strings.

2. An apparatus for use in generating ranked search results using string analysis, comprising:
    a data store comprising an index, wherein the index comprises: a plurality of indexed features corresponding to features of a plurality of strings of a collection to be searched, a mapping between each respective one of the plurality of indexed features and corresponding respective ones of the plurality of strings in the collection containing the respective indexed feature, and a self-information weight for each indexed feature based on the frequency of the indexed feature in the strings of the collection to be searched;
    a user interface for receipt of an input string, wherein the input string is represented as one or more input features;
    a search tool, executable by a computer, that is operable to: select one or more candidate strings from the plurality of strings of the collection that have at least one common indexed feature relative to the input string, calculate a similarity metric for the input string relative to the candidate strings, determine a guaranteed portion of the candidate strings for inclusion in the ranked search results using a guaranteed rank threshold that is calculated based on self-information weights from the index regarding the one or more input features, wherein the guaranteed portion of the strings have a similarity metric greater than the guaranteed rank threshold, and rank the guaranteed portion of the candidate strings for presentation as the ranked search results using the user interface according to the respective similarity weights of the candidate strings.

3. The method of claim 1, wherein the similarity metric is only calculated for the candidate strings.

4. The method of claim 1, wherein the similarity metric comprises an input weight that corresponds to a measure of the contribution of the input features to the similarity metric and a candidate weight that corresponds to a measure of the contribution of candidate features to the similarity metric, and wherein the input weight and the candidate weight sum to a value of one.

5. The method of claim 1, wherein the method further comprises:
re-ranking the ranked search results based on an external metric related to the strings of the collection, wherein the re-ranking is based on the similarity metric and the external metric.

6. The method according to claim 3, wherein the determining comprises an iterative determination of the guaranteed rank threshold considering an additional input feature in ascending order of frequency of input features in the index for each iteration, wherein each iteration of the iterative determination of the guaranteed rank threshold is based on a sum of the self-information weight of each of the input features considered in the iteration.

7. The method of claim 4, wherein the guaranteed rank threshold applies the input weight to the self-information weight of the input string and the candidate weight to difference of the self-information weight of the input string and the sum of the self-information of each of the individual input features included in the guaranteed rank threshold calculation for a given iteration.

8. The method of claim 5, wherein the re-ranking comprises a weighted summation of the similarity metric and the external metric.

9. The method of claim 6, further comprising:
adding additional candidate strings to the guaranteed portion of strings in response to each iterative determination of the guaranteed rank threshold.

10. The method of claim 7, wherein the input weight is greater than the candidate weight.

11. The method of claim 8, wherein the external metric comprises one of a page rank value, a population, and a popularity value.

12. The method of claim 9, further comprising:
determining a potential portion of the candidate strings for inclusion in the ranked search results, wherein the similarity metric for the potential portion of the strings exceeds a minimum similarity metric and is less than the guaranteed rank threshold; and
ranking the guaranteed portion and the potential portion of the candidate strings for presentation as the ranked search results.

13. The method of claim 10, wherein the input weight is at least twice the candidate weight.

14. The method of claim 12, wherein the determining comprises continuing the iterative determination until all input features have been considered in generating the guaranteed rank threshold.

15. The method according to claim 12, wherein the determining comprises continuing the iterative determination until the guaranteed rank threshold falls below a minimum similarity threshold value.

16. The method of claim 12, wherein a maximum number of results parameter is provided, and wherein the determining comprises continuing the iterative determination until the guaranteed portion satisfies the maximum number of results parameter.

17. The method of claim 13, wherein the input weight is at least about 0.9.

18. The method of claim 16, wherein the ranked search results include candidate strings from the potential portion when the guaranteed portion of strings is less than the maximum number of results parameter.

* * * * *